Patented Nov. 3, 1942

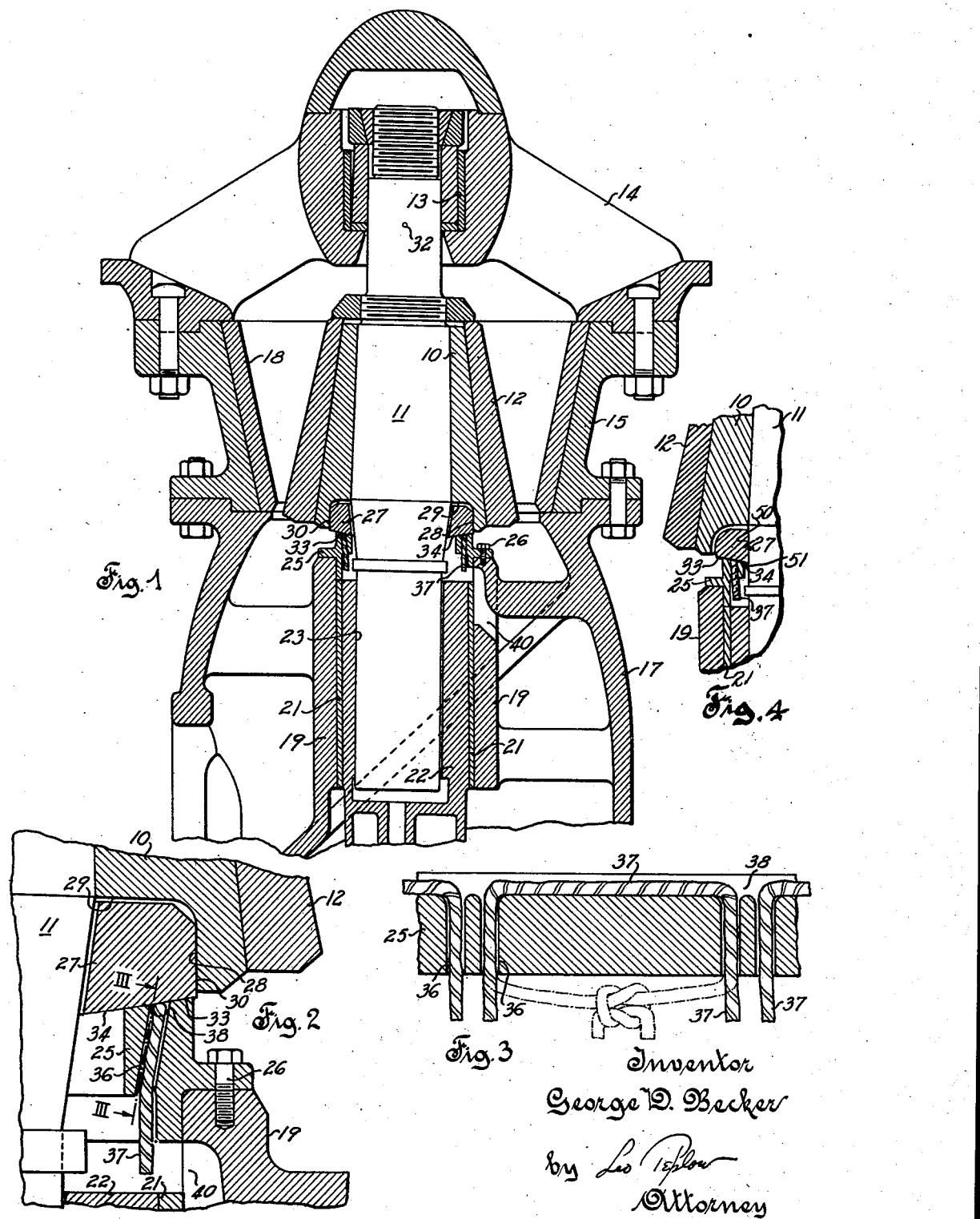

2,300,395

UNITED STATES PATENT OFFICE 2,300,395

DUST SEAL

George D. Becker, Wauwatosa, Wis., assignor to Allis-Chalmers Manufacturing Company, Milwaukee, Wis., a corporation of Delaware Application April 14, 1941, Serial No. 388,390

3 Claims. (Cl. 308—36.1)

This invention relates to a dust seal between two relatively gyrating members, and is particularly applicable to gyratory crushers.

It is an object of this invention to provide a dust seal between two relatively gyrating members in a non-horizontal position.

Another object of the invention is to provide a simple, inexpensive dust seal having novel means for lubricating same.

Other objects will become apparent from the following description taken in conjunction with the drawing, in which:

Fig. 1 is a cross-sectional elevation of a gyratory crusher provided with the dust seal of this invention;

Fig. 2 is an enlarged fragmental cross-section of the dust seal;

Fig. 3 is a development taken along line III—III of Fig. 2; and

Fig. 4 is a sectional view of a modification.

The dust seal of this invention comprises a floating ring making circumferential and plane or spherical sealing contact with two relatively gyrating members, and provides novel wick means for lubricating the spherical surface.

The invention is shown as being applied to seal the space between the gyratory shaft or head and the fixed bearing housing of a cone type gyratory crusher, although it is also applicable to other structures.

In the embodiment illustrated, the gyratory crusher comprises a head 10 carried by a main shaft 11 and supporting a crushing mantle 12. The head and shaft may be suspended from a suitable bearing 13 which permits suitable gyratory, rotary and lengthwise movement of the shaft. Bearing 13 is located in a spider 14 bolted to top shell 15 which is in turn bolted to bottom shell 17. Concave 18 lines the inside of top shell 15 for crushing material between the mantle 12 and concave 18.

Bottom shell 17 is provided with a hub 19 which forms a bearing housing surrounding the lower part of shaft 11 and is provided with a bushing 21. Eccentric bearing 22 is supported (by means not shown) for rotation within bushing 21, and is driven by any known means (not shown). Eccentric bearing 22 has an eccentric bore 23 which receives the lower portion of shaft 11. Rotation of eccentric bearing 22 produces the desired gyration of shaft 11, to crush material between mantle 12 and concave 18.

A dust collar 25 is fastened at 26 to the top of bearing housing 19, and aids in retaining lubricating oil within the bearing housing and in preventing entry of dust and dirt into the bearing housing and eccentric bearing 22. The remaining space between stationary dust collar 25 and rotating gyrating head 10 is closed by a sealing ring 27 which fits within the annular groove 29 at the bottom of head 10. The outer peripheral wall 30 of groove 29 is cylindrical and closely fits the cylindrical surface 28 of sealing ring 27. While the contact between head 10 and sealing ring 27 is illustrated as being arranged at the outer surface 28 of the ring, this contact could obviously be arranged at the inner surface of ring 27 and shaft 11 or head 10. Fig. 4 illustrates a construction in which the sealing surface comprises the inner surface 50 of ring 27, which contacts cylindrical surface 51 on main shaft 11.

As shaft 11 gyrates due to the rotation of eccentric bearing 22, it carries with it sealing ring 27, which is supported freely on the upper surface of dust collar 25. Since the lower part of shaft 11 is moved in a circular path while the upper portion of the shaft is held in relatively fixed position by bearing 13, the resultant movement of the axis of shaft 11 describes a cone having its apex at 32. This conical gyration of the shaft requires a spherical sealing surface, which is provided at 33 at the top of dust collar 25. A complementary spherical surface 34 is provided at the bottom of sealing ring 27. Coacting cylindrical surfaces 28 and 30, as well as complementary spherical surfaces 33 and 34, remain in contact at all times during gyration of the crusher, effectively preventing the entrance of dust and dirt into the lubricating oil and bearings. It will be noted that shaft 11 may be adjusted vertically, within limits, without disturbing the dust seal.

In prior structures of this type, difficulty was encountered in lubricating the spherical surfaces between sealing ring 27 and dust collar 25. Inadequate lubrication of these surfaces, subjected to relative rotary and gyratory movement, resulted in these surfaces becoming scratched and scored, thereby impairing the effectiveness of the entire dust seal.

To overcome this disadvantage of the prior art construction, the structure of this invention provides means for lubricating the spherical surfaces. As best shown in Figs. 2 and 3, dust collar 25 is provided with a plurality of ports 36 extending downward from upper spherical surface 33. One or more wicks 37 are passed through ports 36, and portions of such wicks preferably extend along an annular groove 38 in the spherical surface 33 of dust collar 25.

In normal operation, lubricating oil is carried upward around eccentric bearing 22 and between the eccentric bearing and lower portion of shaft 11, and flows along the upper surface of the eccentric and back to the oil sump or oil pump (not shown) through port 40. The free depending ends of wicks 37 being in the path of oil flowing along the top of eccentric bearing 22 or splashed upward by the rotating eccentric, the wicks carry oil by capillary action through ports 36 and into annular groove 38, thereby effectively lubricating spherical surfaces 33, 34.

If desired, the free ends of wicks 37 may be tied together as shown in dotted lines in Fig. 3, in order to prevent the wicks from being drawn out of ports 36 during operation of the crusher.

While a specific embodiment of the invention has been illustrated and described, it is apparent that modifications and equivalents falling within the scope of the appended claims are included within the purview of this invention. It is obvious that, if the gyratory movement of shaft 11 were uniform throughout the length of the shaft, rather than the conical movement illustrated, surfaces 33 and 34 could be plane surfaces, instead of being spherical. However, the same provision for lubrication would be applicable.

The word "shaft" as used in the claims refers to the shaft per se and to the parts (such as mantle and mantle liner) rigidly attached thereto.

It is claimed and desired to secure by Letters Patent:

1. Sealing means between a vertical bearing housing and a substantially vertical gyratory shaft extending into said housing comprising a stationary dust collar at the upper end of said housing provided with an upper spherical surface, lubricating fluid having a path of flow within said housing, a substantially vertical cylindrical sealing surface carried by said shaft, a sealing ring freely supported for rotary movement on said dust collar spherical sealing surface and coacting with said cylindrical surface of said shafting, and oil wicking extending through said dust collar from grooves located in said spherical sealing surface thereof into said path of flow of said lubricating fluid within said housing.

2. Sealing means as defined in claim 1, said wicking being located within said grooves in said dust collar spherical surface, the ends of said wicking passing through said dust collar and being tied together within said housing.

3. Sealing means between a stationary member and a gyrating substantially vertical shaft comprising a substantially horizontal dust collar attached to said stationary member and provided with an upper bearing surface, lubricating fluid forming a path of flow within said stationary member during normal operation of said gyrating shaft, a sealing ring provided with a peripheral surface in sealing engagement with said shaft and a lower bearing surface coacting with said dust collar upper bearing surface, said sealing ring being freely supported for rotary movement on said dust collar, and oil wicking located in a groove within said upper bearing surface of said dust collar and extending downward through said dust collar into said path of lubricating fluid.

GEORGE D. BECKER.